United States Patent
Masuda et al.

(10) Patent No.: US 9,551,869 B2
(45) Date of Patent: Jan. 24, 2017

(54) COMPOSITE DISPLAY DEVICE

(71) Applicant: YAZAKI CORPORATION, Tokyo (JP)

(72) Inventors: Akira Masuda, Shizuoka (JP); Takeshi Iwamoto, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 14/733,236

(22) Filed: Jun. 8, 2015

(65) Prior Publication Data
US 2015/0268468 A1    Sep. 24, 2015

Related U.S. Application Data

(63) Continuation of application No. PCT/JP2013/083240, filed on Dec. 11, 2013.

(30) Foreign Application Priority Data

Dec. 12, 2012  (JP) .................................. 2012-271708

(51) Int. Cl.
*G02B 27/00* (2006.01)
*G02B 27/01* (2006.01)
(Continued)

(52) U.S. Cl.
CPC .......... *G02B 27/0103* (2013.01); *B60K 35/00* (2013.01); *B60K 37/02* (2013.01); *G02B 27/0101* (2013.01); *G09G 3/001* (2013.01); *G09G 3/36* (2013.01); *G09G 5/00* (2013.01); *G09G 5/10* (2013.01); *G09G 5/36* (2013.01); *B60K 2350/1072* (2013.01); *B60K 2350/2017* (2013.01); *B60K 2350/2052* (2013.01); *G02B 2027/0112* (2013.01); *G02B 2027/0118* (2013.01); *G02B 2027/0134* (2013.01); *G02B 2027/0141* (2013.01); *G02B 2027/0165* (2013.01); *G02B 2027/0198* (2013.01); *G09G 2320/0233* (2013.01); *G09G 2320/0261* (2013.01)

(58) Field of Classification Search
None
See application file for complete search history.

(56) References Cited

U.S. PATENT DOCUMENTS 3,533,104 A * 10/1970 Sincerbox ................. G01S 1/02
                                                    342/178
4,998,784 A *  3/1991 Freeman ............. G02B 27/0103
                                                      359/15
(Continued)

FOREIGN PATENT DOCUMENTS

JP       63-96524 U       6/1988
JP        5-57620 U       7/1993
(Continued)

OTHER PUBLICATIONS

Japanese Office Action for the related Japanese Patent Application No. 2012-271708 dated Jul. 14, 2016.
(Continued)

*Primary Examiner* — Ashish K Thomas
(74) *Attorney, Agent, or Firm* — Kenealy Vaidya LLP

(57) ABSTRACT

A composite display device is provided with an optical combiner, a first display unit which displays a virtual image by projecting an image including certain display information to a front surface of the optical combiner, a second display unit which is disposed on a position of a rear surface side of the optical combiner and displays a real image, and a composite display control unit.

5 Claims, 8 Drawing Sheets

(51) Int. Cl.
*B60K 35/00* (2006.01)
*G09G 5/00* (2006.01)
*G09G 5/10* (2006.01)
*G09G 5/36* (2006.01)
*B60K 37/02* (2006.01)
*G09G 3/00* (2006.01)
*G09G 3/36* (2006.01)

(56) References Cited

U.S. PATENT DOCUMENTS 5,187,597 A * 2/1993 Kato ............... G02B 5/1876
 359/13
2010/0271698 A1* 10/2010 Kessler ............ G02B 27/0081
 359/479

FOREIGN PATENT DOCUMENTS

| | | |
|---|---|---|
| JP | 6-273690 A | 9/1994 |
| JP | 2000-38053 A | 2/2000 |
| JP | 2000-214408 A | 8/2000 |
| JP | 2007-121822 A | 5/2007 |
| JP | 2012-83613 A | 4/2012 |

OTHER PUBLICATIONS

International Search Report and Written Opinion of the International Search Report for PCT/JP2013/083240 dated Jan. 14, 2014.
International Preliminary Report on Patentability and English language Written Opinion of the International Search Report for PCT/JP2013/083240 dated Jun. 16, 2015.

* cited by examiner

COMPOSITE DISPLAY DEVICE

CROSS REFERENCE TO RELATED APPLICATIONS

This application is a continuation of international patent application No. PCT/JP2013/083240 filed on Dec. 11, 2013 based on Japanese Patent Application No. 2012-271708 filed on Dec. 12, 2012, the contents of which are incorporated herein by reference in its entirety.

BACKGROUND OF THE INVENTION

1. Field of the Invention

The present invention relates to a composite display device which is formed of a plurality of display units, and relates to, for example, a display device for a vehicle capable of being used as display of a dashboard in a vehicle.

2. Description of the Related Art

For example, in the vehicle, in order to provide information necessary for driving or information illustrating a state of the vehicle to a driver, a meter unit in which various instruments are embedded is built in a dash board in front of a driver seat. Various technologies related to a display device such as the meter unit have been developed than before so as to improve the visibility or the like.

For example, a head up display (HUD) having excellent visibility is already put into practice. Typically, the head up display projects an optical image to be displayed onto a surface of a combiner from an optical projection device. The driver can see an image which is reflected on the surface of the combiner. That is, display details of a display device that the driver can see is image-formed as a virtual image at an actually nonexistent position in front of the combiner. In addition, since the combiner partially transmits light, the driver can see an image such as actually existent scenery outside the vehicle in a state of being overlapped with the display details of the virtual image.

Techniques disclosed in JP-A-6-273690, JP-A-2000-214408 and JP-UM-A-63-96524 are known as the composite display device which is formed of the plurality of display units.

JP-A-6-273690 discloses a display technique relating to a game machine. Specifically, mobile information displayed on a display device 1 such as a CRT is reflected and diffracted by the hologram combiner 4 to form an image 5 which is enlarged and projected at distance. An observer can see the display where this image 5 and a movable or fixed display body 6 arranged at the rear of the hologram combiner 4 are synthesized. That is, the game machine disclosed in JP-A-6-273690 can perform the display in a state where the enlarged and projected image 5 at distance which is displayed as the virtual image and the display body 6 are synthesized. The enlarged and projected image 5 at distance corresponds to the background image of the game and the display body 6 corresponds to the contents of the game.

JP-A-2000-214408 discloses a picture display device capable of coping with the distance between the eyes of each individual and enabling an observer to surely view diffracted light with the right and left eyes. Specifically, an optical image is projected from picture display devices 1R and 1L, which are independently formed in the right and left sides, to a hologram combiner so that a video converged by the hologram combiner 3 is directly projected to the retina of an observer 4 and observed by the observer 4.

JP-UM-A-63-96524 discloses a head up display which causes a parallax to be generated between images reflected on the right and left eyes. Specifically, a symbol of the left eye and a symbol of the right eye are alternately output in time division. In addition, a light valve which alternately shields the light incident on the right and left eyes is provided.

SUMMARY OF THE INVENTION

For example, in a display device for a vehicle such as a meter unit, it is desired to improve visibility. In addition, it is also important to display a good-looking appearance so as to create high sense of quality. For example, when making notification of an abnormality occurrence or specifying the change of operation states of various types of devices, it is considered to be effective that the change of the display is specially highlighted so that the driver can immediately recognize the change of the display.

However, in a case of a typical display device which displays a real image, it is only possible to perform planar display. Accordingly, the device has less choice of methods to highlight the display and can be used to only adjust the brightness and color of the display. In addition, in a case of a head up display, it is possible to perform the display with a feeling of depth. However, since the virtual image is used, it is difficult to display the specific display information in a state of being specially highlighted or created. The same is applied for the related arts of JP-A-6-273690, JP-A-2000-214408 and JP-UM-A-63-96524.

In addition, the driver of the vehicle frequently changes the position to be focused while driving, and sees various places. Therefore, for example, even in a case where the display device such as the meter unit intentionally displays the information of a warning such as a trouble, the driver is highly likely to be unaware of the display when the driver is looking at a place different from the corresponding place. Accordingly, it is also important to be easily aware of the display of the position which is deviated from the driver's gaze.

The present invention has been made in consideration of the above described circumstance, and an object thereof is to provide a composite display device capable of displaying specific or display information in a state of being particularly highlighted or created.

In order to achieve the above object, a composite display device according to the present invention includes the following descriptions (1) to (4)

(1) A composite display device including:

an optical combiner that reflects and transmits light;

a first display unit that displays a virtual image by projecting an image including certain display information to a front surface of the optical combiner;

a second display unit that is disposed on a position of a rear surface side of the optical combiner and displays a real image; and a composite display control unit that concurrently gives patterns having same or similar shapes as each other to the first display unit and the second display unit as the display information, and gives relative displacement with respect to a direction orthogonal to a gaze axis of an observer to a first display image which is formed by the first display unit as the virtual image and a second display image which is formed by the second display unit as the real image, thereby forming a parallax between the first display image and the second display image.

(2) The composite display device according to (1), wherein the composite display control unit further forms a difference in display pattern size between the first display image and the second display image.

(3) The composite display device according to (1), wherein the composite display control unit further forms a difference in display brightness between the first display image and the second display image.

(4) The composite display device according to (1), further including:

a third display unit that is disposed in a position different from the first display unit and the second display unit, wherein when displaying an image of at least one of the first display unit and the second display unit, the composite display control unit displays display information which is relevant to the image on the third display unit.

According to the composite display device of the configuration described in (1), it is possible to display a pattern by synthesizing the first display image which is formed as the virtual image and the second display image which is formed as the real image. In addition, since deviation occurs between the position on which the first display image is displayed and the position on which the second display image is displayed, it is possible to cause a three-dimensional sense of highlight with respect to the observer's visual. Further, the pattern which is synthesized to be displayed is obtained by combining the virtual image and the real image, and thus it is possible to create a more effective sense of highlight.

According to the composite display device of the configuration described in (2), since the first display image and the second display image are displayed in a state of having a different size from each other and then synthesized, it is possible to create a more effective stereoscopic feeling.

According to the composite display device of the configuration described in (3), since the first display image and the second display image are displayed in a state of having the different brightness from each other and then synthesized, it is possible to create a more effective stereoscopic feeling.

According to the composite display device of the configuration described in (4), it is possible to display items of display information, which are relevant to each other, almost at the same time in a plurality of places. Therefore, for example, even in a case where the observer (the driver or the like) is focusing on a place different from the place of the first display unit or the second display unit, when the driver is looking at the place where the third display unit is visible, the display recognition of the third display unit causes the driver to be aware of the display in the first display unit and the second display unit. For this reason, the visibility can be improved and thus the effect of highlight and creation of the display can be obtained.

According to the composite display device of the present invention, it is possible to display specific or certain display information in a state of being particularly highlighted or created.

As above described, the present invention is briefly described. Further, details of the invention will be further clarified by reading through embodiments of the invention described below (hereinafter, referred to as "embodiment") with reference to the accompanying drawings.

DETAILED DESCRIPTION OF THE EXEMPLARY EMBODIMENTS

An embodiment of a composite display device of the present invention will be described in detail below with reference to the drawings.

<First Embodiment>
<Appearance of Device>

Figure 1:
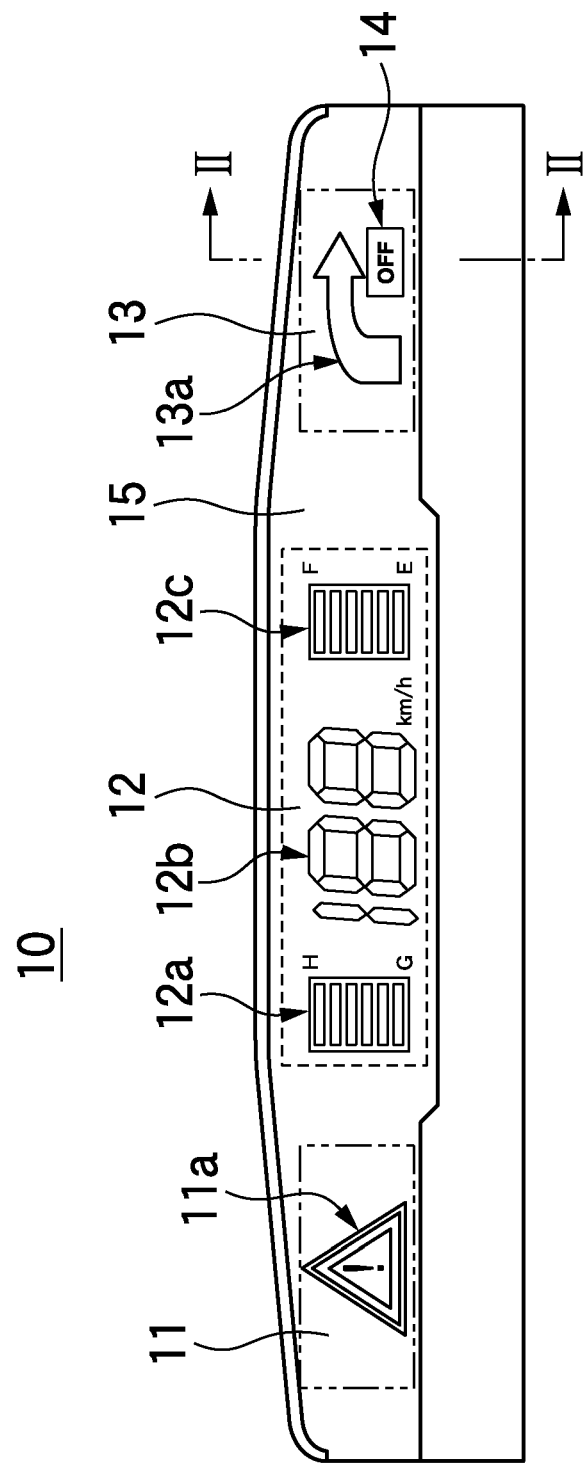
FIG. 1 is a front view illustrating a specific example of an appearance of a meter unit.

A specific example of an appearance of a meter unit 10 is illustrated in FIG. 1. The meter unit 10 is, as a vehicle onboard unit, built in a vehicle such as an automobile. That is, the meter unit 10 is installed at a position of a dash board which is positioned in front of a driver's seat in the vehicle in order to display information required for the driver to drive a vehicle and transmit the information to a driver.

The meter unit 10 illustrated in FIG. 1 is roughly divided into four display units. That is, a left side display unit 11, a central display unit 12, a right side display unit 13, and a composite display unit 14 are provided in the meter unit 10. In addition, a combiner 15 is installed in a front surface of the meter unit 10 (a position closer to a driver than a display part). The combiner 15 is an optical member, and can synthesize a plurality of optical images by the combination of reflection and transmission of light.

The left side display unit 11 is disposed on the left side of the meter unit 10, and includes warning display unit 11*a* as a representative example as illustrated in FIG. 1. The warning display unit 11*a* displays visual information and this visual information represents a real image. That is, the driver can directly see and confirm the visual information displayed on an indicator of the left side display unit 11.

The central display unit 12 is disposed in the center portion of the meter unit 10. The central display unit 12 illustrated in FIG. 1 is provided with a water temperature display portion 12*a*, a vehicle speed display portion 12*b*, and a fuel display portion 12*c*. The water temperature display portion 12*a* is used to display a bar graph depicting a temperature of cooling water of the vehicle. The vehicle speed display portion 12*b* is used to display a numerical value depicting a current driving speed (km/h) of the vehicle. The fuel display portion 12*c* is used to display a bar graph depicting a fuel remaining amount of the vehicle.

The display of each of the water temperature display portion 12*a*, the vehicle speed display portion 12*b*, and the fuel display portion 12*c* in the central display unit 12 is performed by using a virtual image that a head up display (HUD) displays. In other words, the driver sees and confirms an image which is projected by the combiner 15 and then reflected on the surface of the combiner 15.

The right side display unit 13 is disposed on the right end side of the meter unit 10 and includes a direction display portion 13a as a representative example as illustrated in FIG. 1. This direction display portion 13a displays the visual information and the visual information represents a real image. That is, the driver can see and confirm the visual information displayed on the indicator of the right side display unit 13.

The composite display unit 14 is disposed on the inside of the right side display unit 13, and is formed as an area smaller than that of the right side display unit 13. In addition, the composite display unit 14 of which a display range is partially overlapped with a display range of the right side display unit 13. The composite display unit 14 can cause the driver to see and confirm an image which is obtained by synthesizing the real image and the virtual image as the displaying visual information. That is, the composite display unit 14 is formed by combining a head up display which displays the virtual image with the indicator which displays the real image. The indicator for displaying the real image on the composite display unit 14 is also included in the right side display unit 13.

<Configuration of Structural Mechanism of Composite Display Unit 14>

Figure 2:
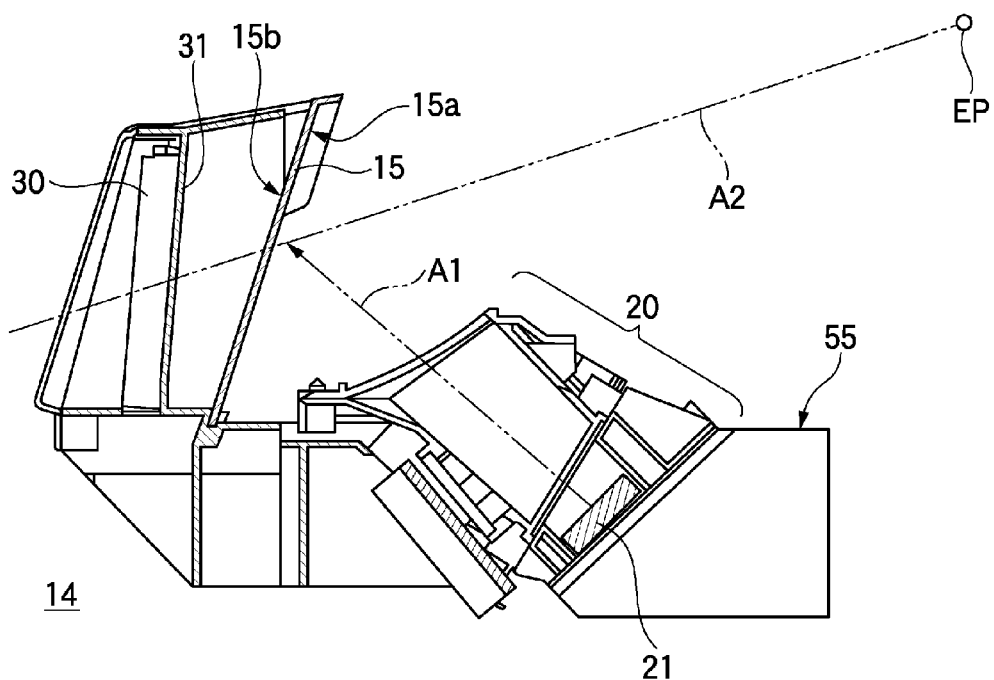
FIG. 2 is a longitudinal cross-sectional view illustrating a cross-sectional structure when viewed from line II-II in FIG. 1.

The cross-sectional structure of the composite display unit 14 is illustrated in FIG. 2 when viewed from line II-II in FIG. 1. As illustrated in FIG. 2, the composite display unit 14 is provided with a virtual image projection unit 20, a real image display unit 30, and the combiner 15. The real image display unit 30 is a common component with the right side display unit 13, and includes a liquid crystal display indicator 31. It is possible to display various types of visual information on a screen on the surface of the liquid crystal display indicator 31 as the real image.

The virtual image projection unit 20 is, as illustrated in FIG. 2, embedded in the inside of an installment panel 55 in a state of being exposed. This virtual image projection unit 20 includes a liquid crystal display indicator 21 which is capable of displaying various types of visual information. In addition, the liquid crystal display indicator 21 is a light transmission-type display unit, and includes a backlight on the rear surface side. In other words, by illuminating the visual information displayed on the liquid crystal display indicator 21 by the backlight from the rear surface side, it is possible to project the optical image of the visual information to the combiner 15 along an optical axis Al illustrated in FIG. 2

The combiner 15 can reflect the light incident on a front surface 15a along the optical axis Al to a direction of a driver's view point EP. Further, the light incident from the side of a rear surface 15b is transmitted through the combiner 15. Therefore, in a case where the driver observes the composite display unit 14 by viewing the direction from the view point EP to an eye gaze A2, the driver can concurrently see and confirm items of visual information of the real image and the virtual image in a state where the real image and the virtual image are overlapped with each other. The real image is obtained by being transmitted through the combiner 15 which is displayed on the screen of the liquid crystal display indicator 31 and then incident to the view point EP, and the virtual image is obtained by reflecting on the front surface 15a of the combiner 15 and then incident to the view point EP.

Meanwhile, in the present embodiment, it is assumed that the virtual image is formed by the light being reflected once on the surface of the combiner 15; however, the virtual image may be formed by disposing a predetermined optical mirror in the inside of the virtual image projection unit 20 and using the light which is reflected several times on the optical mirror.

<Specific Example of Display Details of Composite Display Unit 14>

Figure 3:
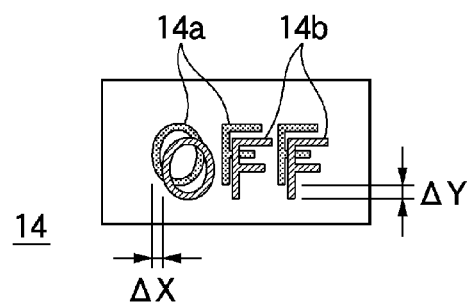
FIG. 3 is a front view enlargely illustrating display details of a composite display unit of the meter unit illustrated in FIG. 1.

FIG. 3 illustrates the specific example of the display details of the composite display unit 14 in the meter unit 10, illustrated in FIG. 1. In the example illustrated in FIG. 3, it is assumed that the composite display unit 14 displays the text "OFF" as the visual information. In this case, the liquid crystal display indicators 21 and 31 respectively display the text "OFF" as the visual information.

The visual information displayed on the liquid crystal display indicator 31 is reflected in an observer's eye at the view point EP as the real image display 14a illustrated in FIG. 3. In addition, the visual information displayed on the liquid crystal display indicator 21 is reflected in an observer's eye at the view point EP as the virtual image display 14b illustrated in FIG. 3.

That is, the observer which is positioned at the view point EP can see and confirm in the state in which, as illustrated in FIG. 3, the real image display 14a and the virtual image display 14b are overlapped with each other. At this time, the observer can see the real image display 14a on the screen of the liquid crystal display indicator 31. In addition, the observer can see the virtual image display 14b which is imaged at a position farther than the combiner 15 and the liquid crystal display indicator 31.

In the example illustrated in FIG. 3, the real image display 14a and the virtual image display 14b have substantially the same shape and the same size of the visual information (the text pattern "OFF"). In addition, as illustrated in FIG. 3, a relative positional deviation between the real image display 14a and the virtual image display 14b occurs in the lateral direction by $\Delta x$ and in the vertical direction by $\Delta y$. In other words, the images are displayed in a state in which a parallax is formed. The positional deviation ($\Delta x$, $\Delta y$) indicates the result obtained by intentionally controlling the position to be deviated so as to highlight the display. That is, at least one of the virtual image projection unit 20 and the real image display unit 30 can control the display position or the projection direction so that the observer can recognize the positional deviation ($\Delta x$, $\Delta y$) at the position of the view point EP.

<Configuration of Electric Circuit>

Figure 4:
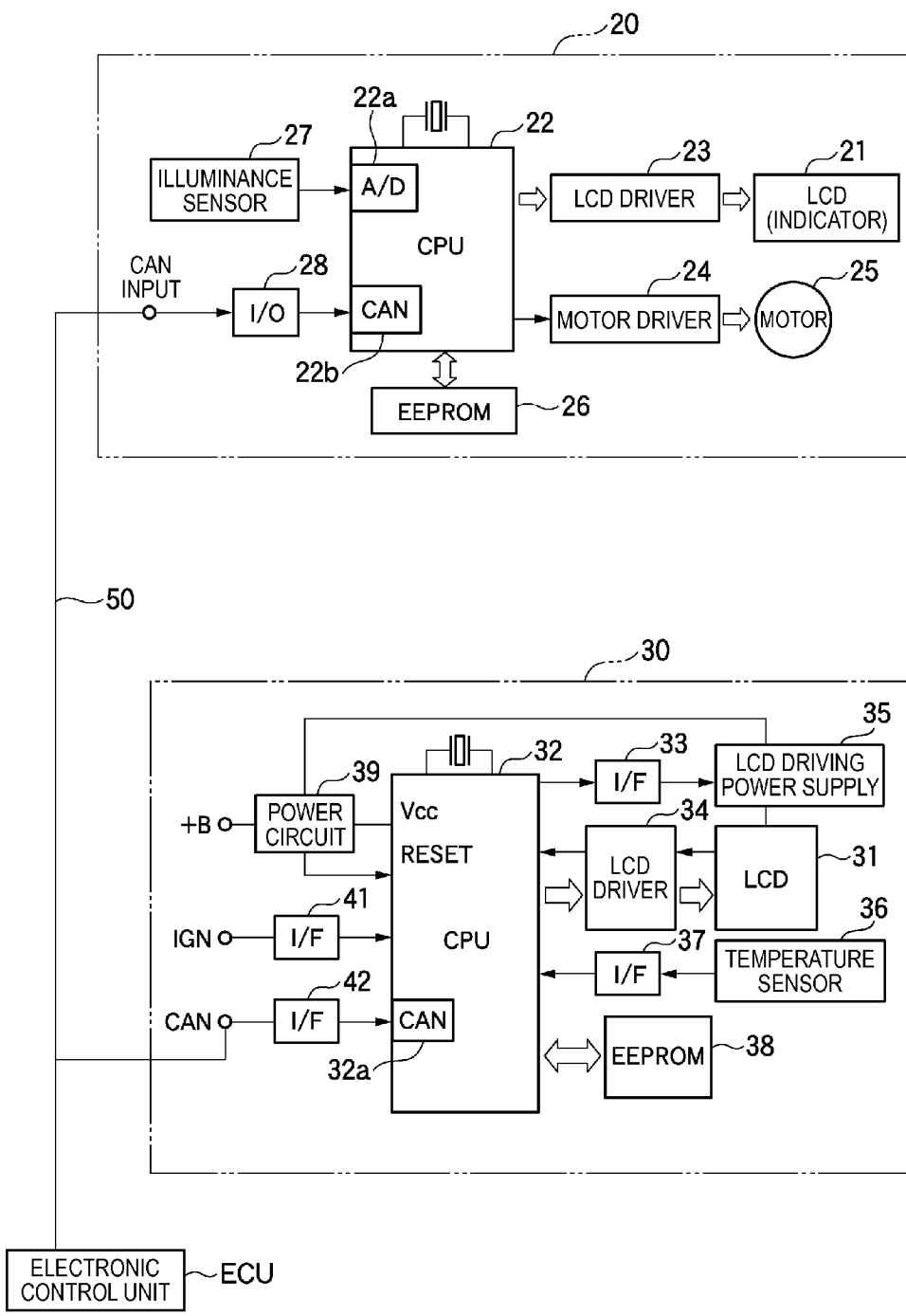
FIG. 4 is a block diagram illustrating a configuration example of an electric circuit of a composite display device which is included in the meter unit illustrated in FIG. 1.

The configuration of the electric circuit of the composite display device included in the meter unit 10 which is illustrated in FIG. 1 is illustrated in FIG. 4. That is, the display of the composite display unit 14 illustrated in FIG. 1 is implemented by the composite display device illustrated in FIG. 4. Further, in addition to the composite display device illustrated in FIG. 4, a display circuit corresponding to the left side display unit 11 and the central display unit 12 is included in the meter unit 10 illustrated in FIG. 1. The right side display unit 13 is formed by sharing the circuit with the composite display device.

The composite display device illustrated in FIG. 4 is provided with a virtual image projection unit 20, a real image display unit 30, and an electronic control unit ECU. In addition, the virtual image projection unit 20, the real image display unit 30, and electronic control unit ECU are connected to each other via an on-board communication network 50 in a communicable state.

Meanwhile, the composite display device of the present embodiment includes the electronic control unit ECU. In a case where a function equivalent to the electronic control unit ECU is built in at least one of the virtual image projection unit 20 and the real image display unit 30, it is also possible to implement the composite display device without using the electronic control unit ECU.

<Configuration of Virtual Image Projection Unit 20>

As illustrated in FIG. 4, the virtual image projection unit 20 is provided with a liquid crystal display (LCD) indicator 21, a microcomputer (CPU) 22, an LCD driver 23, a motor driver 24, an electric motor 25, a read-only memory (EEPROM) 26, an illuminance sensor 27, and an input and output circuit (I/O) 28.

The liquid crystal display indicator 21 includes a transmission type liquid crystal display panel, and can display a visual information pattern such as the text. In addition, the liquid crystal display indicator 21 is provided with relatively a large amount of back-light which illuminates the liquid crystal display panel from the rear surface side.

The microcomputer 22 can perform various types of control required for the virtual image projection unit 20 by reading out a program prepared in advance. In addition, the microcomputer 22 is equipped with an A/D conversion unit 22a which converts an analog signal into a digital signal and a CAN communication control unit 22b which corresponds to a controller area network (CAN) standard and is capable of controlling the communication.

The LCD driver 23 has a function for the control of the display details and a display state (existence of display, brightness of lighting, or the like) of the liquid crystal display indicator 21 in accordance with a control signal which is output from the microcomputer 22.

The motor driver 24 has a function for the control of a driving state of the electric motor 25 in accordance with a control signal which is output from the microcomputer 22. The electric motor 25 is linked to a movable optical system of the virtual image projection unit 20, and can change a direction of the optical axis (A1) of the light which is projected by the virtual image projection unit 20.

The read-only memory 26 is an EEPROM capable of performing data rewriting. The read-only memory 26 holds in advance a program which is required to be performed by the microcomputer 22, display pattern data which is displayed on the liquid crystal display indicator 21, and data such as various constants which is used by the microcomputer 22.

The illuminance sensor 27 detects the brightness of external light of the surface of the installment panel on which the virtual image projection unit 20 is installed. The microcomputer 22 can properly control the brightness of the liquid crystal display indicator 21 according to the brightness of external light detected by the illuminance sensor 27.

The input and output circuit 28 is an interface for connecting the microcomputer 22 to the on-board communication network 50 which satisfies the CAN standard. The microcomputer 22 can perform data communication between electronic control units ECU which are equipped on the same vehicle, via the input and output circuit 28 and the on-board communication network 50.

<Configuration of Real Image Display Unit 30>

As illustrated in FIG. 4, the real image display unit 30 is provided with a liquid crystal display (LCD) indicator 31, a microcomputer (CPU) 32, interfaces (I/F) 33, 37, 41, and 42, an LCD driver 34, an LCD driving power supply 35, a temperature sensor 36, a read-only memory (EEPROM) 38, and a power circuit 39.

The liquid crystal display (LCD) indicator 31 includes a liquid crystal display panel with a screen size larger than that of the liquid crystal display indicator 21, and can display various visual information patterns, for example, a text, a figure, and an image. A portion of a display area of the liquid crystal display indicator 31 is used as the composite display unit 14, and the other portion thereof is used as the right side display unit 13. In other words, the composite display unit 14 uses a portion of the area of the display screen of the right side display unit 13 so as to display the visual information of the real image.

The microcomputer (CPU) 32 can perform various types of control required for the real image display unit 30 by reading out a program prepared in advance. In addition, the microcomputer 32 is equipped with a CAN communication control unit 32a which corresponds to the CAN standard and is capable of controlling the communication.

The interface 33 converts a control signal which is output from the microcomputer 32 to a signal voltage required for the control of the LCD driving power supply 35, and then applies the converted control signal to the LCD driving power supply 35.

The LCD driver 34 has a function for the control of the display details and the display state (the existence of display, the concentration, the brightness of lighting, or the like) of the liquid crystal display indicator 31 in accordance with a control signal which is output from the microcomputer 32. The LCD driving power supply 35 generates a direct current voltage required for the driving of the liquid crystal display indicator 31 based on the direct current voltage which is output by the power circuit 39, and then applies the generated direct current voltage to the liquid crystal display indicator 31.

The temperature sensor 36 detects a temperature of the real image display unit 30. The microcomputer 32 can acquire the information of the temperature which is detected by the temperature sensor 36 via the interface 37.

The read-only memory 38 is an EEPROM capable of performing data rewriting. The read-only memory 38 holds in advance a program which is required to be performed by the microcomputer 32, display pattern data which is displayed on the liquid crystal display indicator 31, and data such as various constants which is used by the microcomputer 32.

The power circuit 39 generates the stable direct current power voltage (for example, +5 V) which is required to operate each circuit of the real image display unit 30 from the direct current voltage (for example, +12 V) which is supplied from a power supply line (+B) on the vehicle side. In addition, the power circuit 39 generates a reset signal and supplies the reset signal to the microcomputer 32.

The interface 41 converts an ignition signal (IGN) which is generated on the vehicle side to the voltage suitable for a process performed by the microcomputer 32 and then applies the converted ignition signal to the microcomputer 32.

The interface 42 performs a signal process required to connect the microcomputer 32 to the on-board communication network 50 which corresponds to the CAN standard.

<Configuration of Electronic Control Unit ECU>

The electronic control unit ECU is built in the meter unit 10 or is equipped on the vehicle side, and is connected to the meter unit 10 via the on-board communication network 50. This electronic control unit ECU can implement various types of control by being equipped with a microcomputer (not shown) and a communication function, and performing a program which is embedded in the microcomputer in advance.

In the present embodiment, the electronic control unit ECU determines the visual information which is required to be displayed on the right side display unit 13 and the composite display unit 14 according to the situation of the vehicle, and then controls the virtual image projection unit 20 and the real image display unit 30 via the on-board communication network 50.

<Operation of Composite Display Device>
<Basic Operation of Virtual Image Projection Unit 20 and Real Image Display Unit 30>

Figure 5:
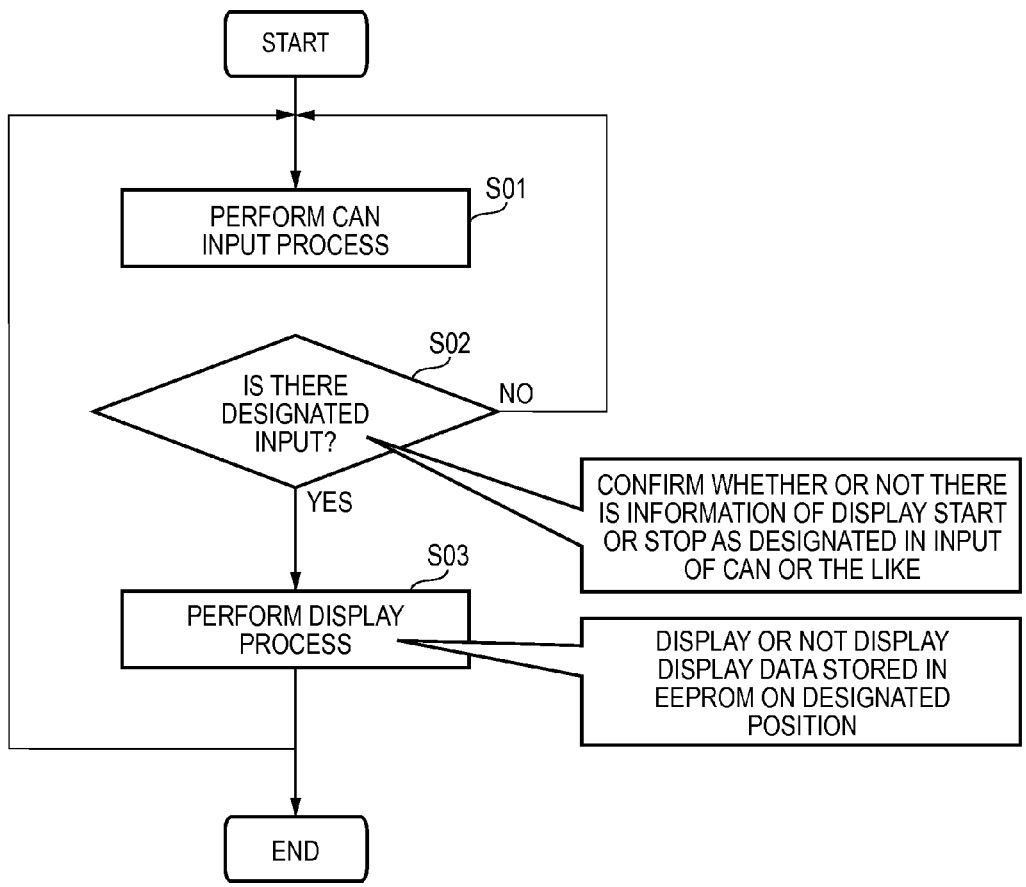
FIG. 5 is a flowchart illustrating a main operation of a virtual image projection unit and a real image display unit.

A main operation of the virtual image projection unit 20 and the real image display unit 30 is illustrated in FIG. 5. The basic operation is performed such that the virtual image projection unit 20 and the real image display unit 30 are operated in the same way. In other words, the microcomputer 22 of the virtual image projection unit 20 performs the control illustrated in FIG. 5. In addition, the microcomputer 32 of the real image display unit 30 also performs the control illustrated in FIG. 5.

<Operation of Virtual Image Projection Unit 20>

The microcomputer 22 of the virtual image projection unit 20 monitors a signal which is input from the on-board communication network 50 via the input and output circuit 28 and then performs a process of the signal input from the electronic control unit ECU (S01).

The microcomputer 22 of the virtual image projection unit 20 identifies whether or not a signal of display control relevant to the visual information which is required to be displayed on the composite display unit 14 is input from the electronic control unit ECU (S02). In a case where an instruction to start or stop the display relevant to the predesignated display details (the visual information which is subjected to highlight display) is input, the process proceeds from step S02 to step S03.

The microcomputer 22 of the virtual image projection unit 20 displays the visual information designated by the electronic control unit ECU as the virtual image on the designated position (S03). The pattern data such as the text of the visual information which is actually displayed is acquired by being read out from the read-only memory 26.

The display position of the visual information displayed by the virtual image projection unit 20 can be controlled by adjusting the display position on the screen of the liquid crystal display indicator 21 or the direction of the optical axis A1.

<Operation of Real Image Display Unit 30>

The microcomputer 32 of the real image display unit 30 monitors a signal which is input from the on-board communication network 50 via the interface 42 and then performs a process of the signal input from the electronic control unit ECU (S01).

The microcomputer 32 of the real image display unit 30 identifies whether or not a signal of display control relevant to the visual information which is required to be displayed on the composite display unit 14 is input from the electronic control unit ECU (S02). In a case where an instruction to start or stop the display relevant to the predesignated display details (the visual information which is subjected to highlight display) is input, the process proceeds from step S02 to step S03.

The microcomputer 32 of the real image display unit 30 displays the visual information designated by the electronic control unit ECU as the real image on the designated position on the screen of the liquid crystal display indicator 31 (S03). The pattern data such as the text of the visual information which is actually displayed is acquired by being read out from the read-only memory 38.

<Configuration of Electronic Control Unit ECU>

Figure 6:
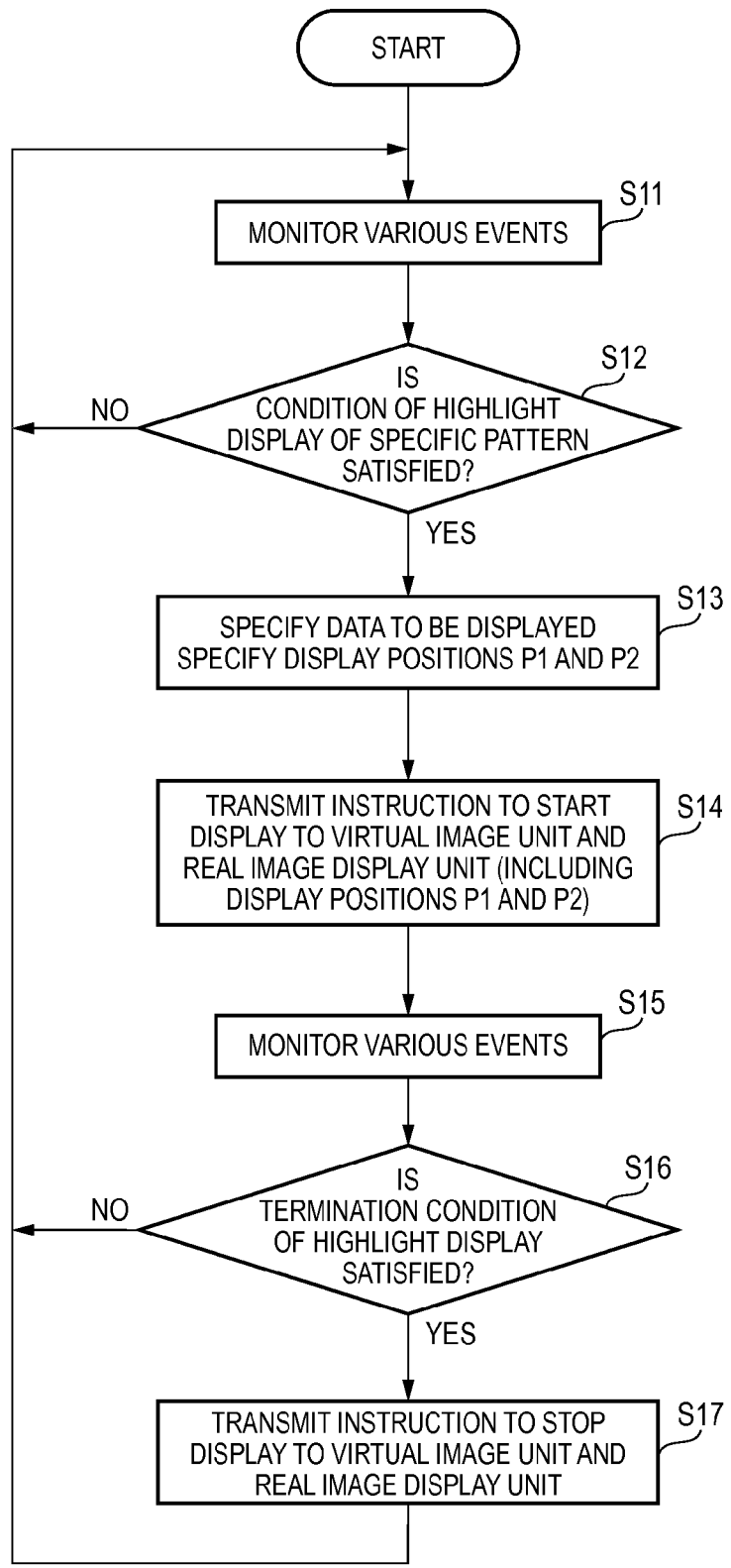
FIG. 6 is a flowchart illustrating a main operation of an electronic control unit illustrated in FIG. 4.

The main operation of the electronic control unit ECU illustrated in FIG. 4 is illustrated in FIG. 6. The operation of the electronic control unit ECU will be described below in detail.

In step S11, the electronic control unit ECU monitors various events which are likely to occur on the vehicle, for example, occurrence of failure in each unit, and a switch operation by the driver and then recognizes the current situation in relation to the display.

In step S12, the electronic control unit ECU identifies whether or not the current situation which is recognized in S11 coincides with a condition that the specified pattern (for example, the text pattern "OFF") is required to be highlight-displayed. If the condition for the highlight display of the specified pattern is satisfied, the process proceeds to the next step S13.

In step S13, the electronic control unit ECU specifies data to be displayed in accordance with the types of events occurred. The data to be displayed is a display code which is associated with the pattern such as the text "OFF". In addition, the electronic control unit ECU specifies each of a display position P1 of the data to be displayed in the virtual image projection unit 20 and a display position P2 of the data to be displayed in the real image display unit 30.

Here, the specified display positions P1 and P2 are relatively and slightly deviated such that positional deviation (Δx, Δy) as illustrated in FIG. 3 is intentionally generated.

In step S14, the electronic control unit ECU transmits the instruction to start the display relevant to the display information which is specified in S13 to each of the virtual image projection unit 20 and the real image display unit 30. In addition, the display position P1 is transmitted to the virtual image projection unit 20 and the display position P2 is transmitted to the real image display unit 30.

In step S15, the electronic control unit ECU monitors various events which are likely to occur on the vehicle, for example, occurrence of failure in each unit, and a switch operation by the driver and then recognizes the current situation in relation to the display.

In step S16, the electronic control unit ECU identifies whether or not the current situation which is recognized in S15 satisfies a termination condition of the highlight display which instructs the display to be started in S14, and if the termination condition is satisfied, the process proceeds to the next step S17.

In step S17, the electronic control unit ECU transmits the instruction to stop the display relevant to the highlight display which instructs to start the display in S14 to the virtual image projection unit 20 and the real image display unit 30, and then the highlight display is terminated.

The electronic control unit ECU performs the control illustrated in FIG. 6, and thereby the virtual image projection unit 20 performs the display corresponding to the virtual image display 14*b* illustrated in FIG. 3, and the real image display unit 30 performs the display corresponding to the real image display 14*a*.

Accordingly, the driver who observes the display of the meter unit 10 at the position of view point EP can see and confirm the composite display unit 14 of the visual information illustrated in FIG. 3, which is obtained by synthesizing the virtual image display 14*b* and the real image display 14*a*. The driver can recognize the visual information illustrated in FIG. 3 as the highlight display since the visual information is obtained by synthesizing the virtual image display 14*b* and the real image display 14*a* and the display positions of the virtual image display 14*b* and the real image display 14a are relatively and slightly deviated (Δx, Δy). In addition, since the visual information is obtained by synthesizing the virtual image display 14b and the real image display 14a, it is possible to achieve a feeling of depth and a stereoscopic effect.

Note that, in the present embodiment, it is assumed that the display details and display position of the virtual image projection unit 20 and the real image display unit 30 are controlled by the electronic control unit ECU, but it is possible that the microcomputer 22 of the virtual image projection unit 20 or the microcomputer 32 of the real image display unit 30 can also perform the same control as above. In addition, the control amount corresponding to the positional deviation (Δx, Δy) between the virtual image display 14b and the real image display 14a which are synthesized to be displayed may be stored in the electrically erasable programmable read-only memories 26 and 38 or the like as a predetermined fixed data.

<Description of Modification Example>

Figure 7:
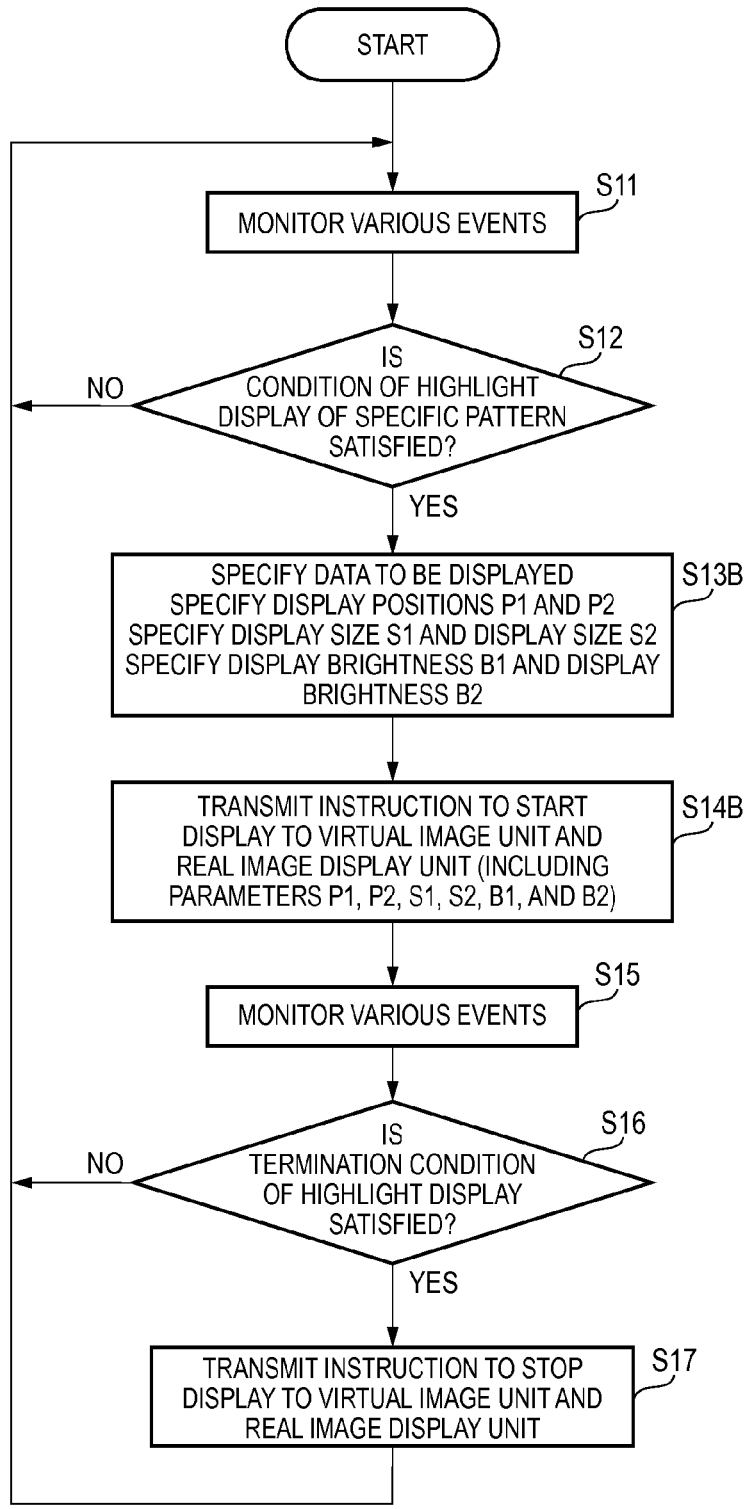
FIG. 7 is a flowchart illustrating Modification Example (1) of the operation illustrated in FIG. 6.

Modification Example (1) of the operation which is illustrated in FIG. 6 is illustrated in FIG. 7. In the operation illustrated in FIG. 7, steps S13B and S14B are added instead of steps S13 and S14 in FIG. 6.

In step S13B of FIG. 7, the electronic control unit ECU specifies the data to be displayed and the display positions P1 and P2 as in S13, and further specifies display size S1 and display size S2 and display brightness B1 and display brightness B2.

Here, the display size S1 corresponds to, for example, the size (the size of the pattern such as the text) of the visual information which is displayed by the virtual image projection unit 20 as the virtual image display 14b illustrated in FIG. 3, and the display size S2 corresponds to the size of the visual information which is displayed by the real image display unit 30 as the real image display 14a. In addition, the display brightness B1 represents the brightness of the visual information (including the brightness of the lighting and the concentration of the display) which is displayed by the virtual image projection unit 20, and the display brightness B2 represents the brightness of the visual information displayed by the real image display unit 30. In other words, the electronic control unit ECU can determine the size and the brightness of the real image display 14a, and the size and the brightness of the virtual image display 14b as parameters which are different from each other.

In step S14B of FIG. 7, the electronic control unit ECU transmits the instruction to start the display relevant to the display information which is specified in S13 to each of the virtual image projection unit 20 and the real image display unit 30. In addition, the display position P1, the display size S1, and the display brightness B1 are transmitted to the virtual image projection unit 20 as a parameter, and the display position P2, the display size S2, the display brightness B2 are transmitted to the real image display unit 30 as a parameter.

Accordingly, in Modification Example, as illustrated in a display example of FIG. 3, it is not only possible to deviate the position between the real image display 14a and the virtual image display 14b which are synthesized to be displayed but also possible to provide the relative difference in both pattern size and the display brightnesse pattern size and the display brightness can also be relatively differentiated. For this reason, it is possible to further improve the effect of the highlight display of the composite display unit 14 and to allow the appearance to be improved.

<Second Embodiment>
<Description of Appearance>

Figure 8:
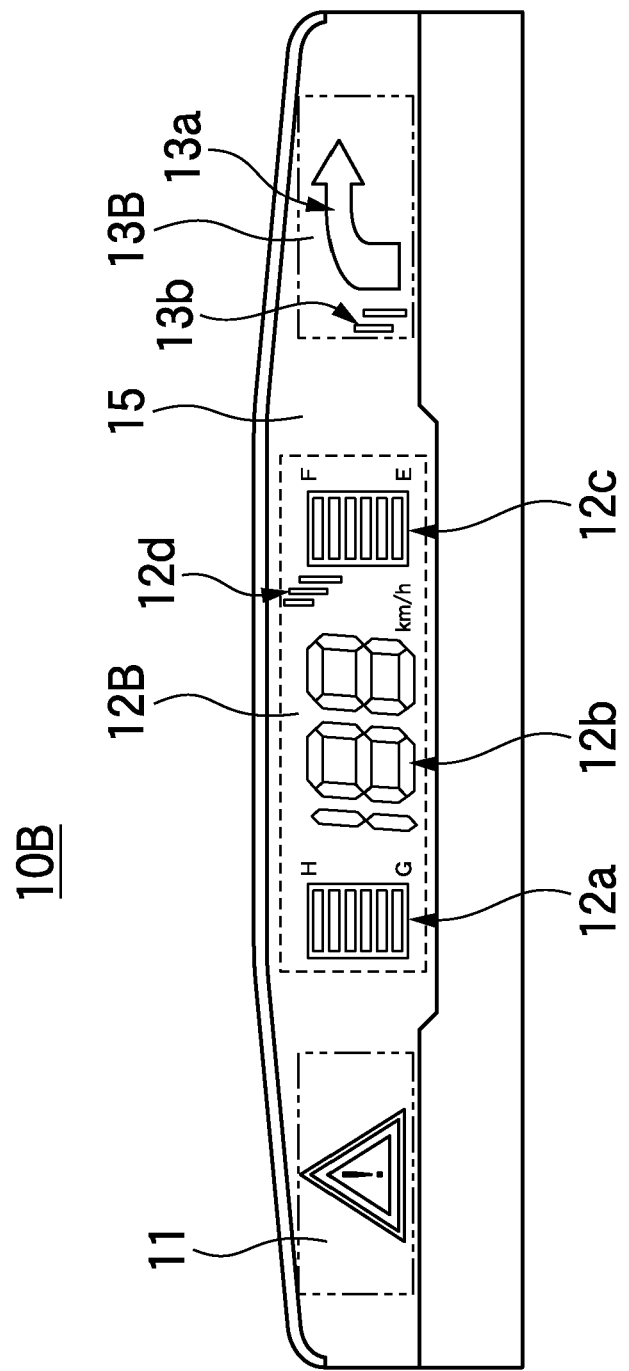
FIG. 8 is a front view illustrating Modification Example relating to the appearance of the meter unit.

A specific example of an appearance of a meter unit 10B of the present embodiment is illustrated in FIG. 8. The meter unit 10B illustrated in FIG. 8 is a modification example of the meter unit 10 illustrated in FIG. 1, and is provided with the left side display unit 11, a central display unit 12B, and a right side display unit 13B. In addition, a portion of the right side display unit 13B can be displayed by being overlapped with the real image and the virtual image which is the same as those of the aforementioned composite display unit 14.

In addition, the central display unit 12B in FIG. 8 includes a cooperative display unit 12d, and the right side display unit 13B includes a cooperative display unit 13b. In the present embodiment, the cooperative display unit 12d and the cooperative display unit 13b which are disposed at mutually distant positions are used to display the same situation or used to display the situation of greater relevance to each other.

The display details of the central display unit 12B are displayed as the virtual image by projecting light to the combiner 15 using a device (not shown) which has the same configuration as that of the virtual image projection unit 20 illustrated in FIG. 2. The display details of the right side display unit 13B are displayed as the real image on the liquid crystal display indicator 31 illustrated in FIG. 2. In the cooperative display unit 13b, the real image and the virtual image can be displayed similar to the case of the composite display unit 14 described above.

<Configuration of Electric Circuit>

The composite display device of the present embodiment is provided with, similar to the configuration illustrated in FIG. 4, the virtual image projection unit 20, the real image display unit 30, and an electronic control unit ECU. In addition, the virtual image projection unit 20 of the present embodiment can control the virtual image display of the entire of the central display unit 12B and the virtual image display of the cooperative display unit 13b, and the real image display unit 30 can control the real image display of the right side display unit 13B including the cooperative display unit 13b.

<Operation of Composite Display Device>

Figure 9:
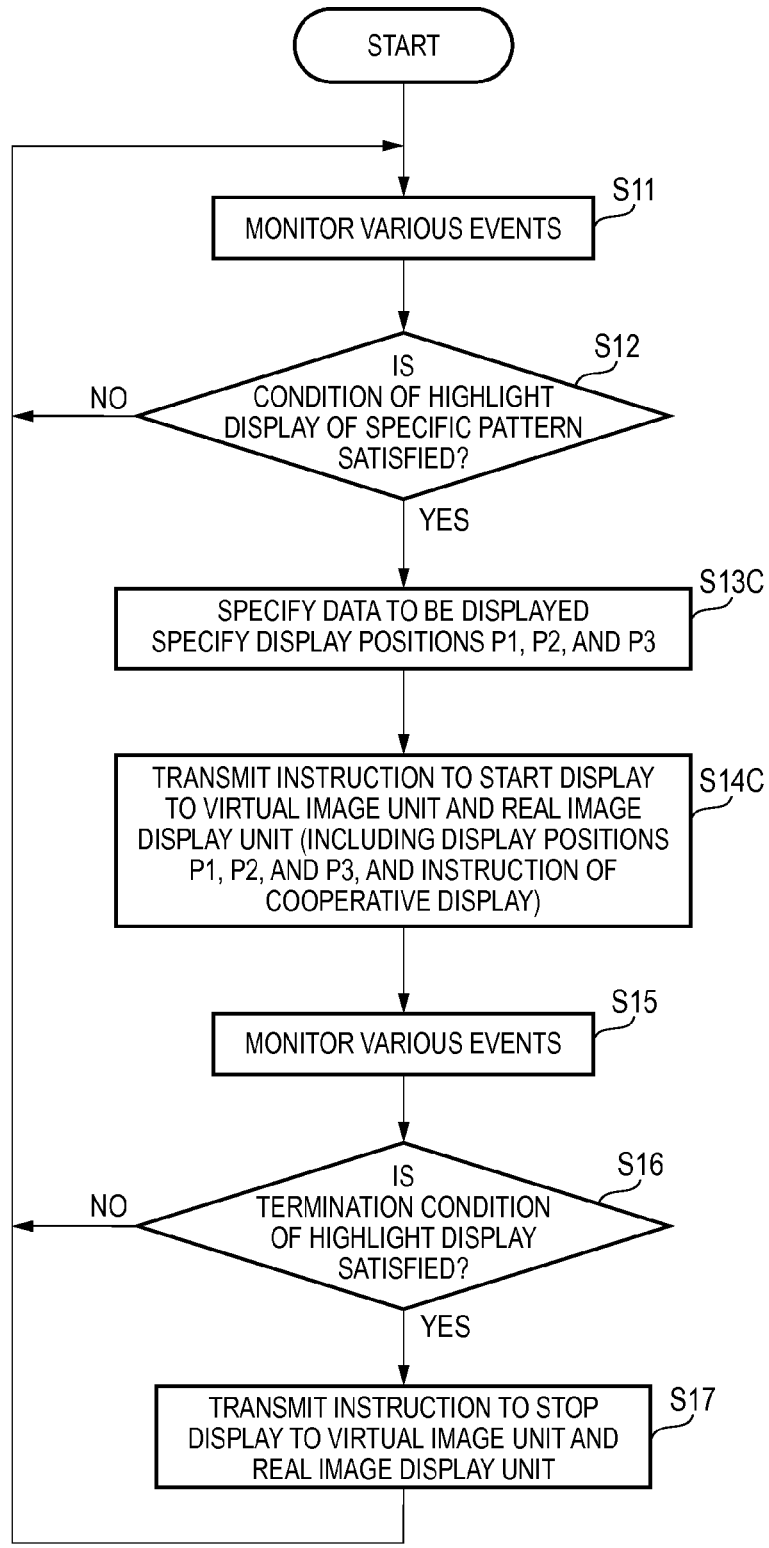
FIG. 9 is a flowchart illustrating Modification Example (2) of the operation illustrated in FIG. 6.

Modification Example (2) of an operation illustrated in FIG. 6 is illustrated in FIG. 9. That is, also in the present embodiment, the electronic control unit ECU illustrated in FIG. 4 controls each of the virtual image display of the virtual image projection unit 20 and the real image display of the real image display unit 30 by performing the operation illustrated in FIG. 9. In the operation illustrated in FIG. 9, steps S13C and S14C are added instead of steps S13 and S14 in FIG. 6.

In step S13C of FIG. 9, the electronic control unit ECU specifies data to be displayed according to the types of generated event. The data to be displayed represents a segment to be displayed, for example, the cooperative display unit 12d and the cooperative display unit 13b illustrated in FIG. 8.

In addition, when controlling the cooperative display unit 12d and the cooperative display unit 13b which are separately disposed, the electronic control unit ECU specifies each of the virtual image display position P1 of the cooperative display unit 12d and the virtual image display position P2 of the cooperative display unit 13b in the virtual image projection unit 20, and the real image display position P3 of the cooperative display unit 13b in the real image display unit 30. Here, the specified display positions P2 and P3 are relatively and slightly deviated such that positional deviation (Δx, Δy) as illustrated in FIG. 3 is intentionally generated.

In step S14C of FIG. 9, the electronic control unit ECU transmits the instruction to start the display relevant to the display information which is specified in S13B to each of the virtual image projection unit 20 and the real image display unit 30. In addition, the display positions P1 and P2 are transmitted to the virtual image projection unit 20 and the display position P3 is transmitted to the real image display unit 30. In addition, when controlling the cooperative display unit 12d and the cooperative display unit 13b which are separately disposed, an instruction to interlock the cooperative display unit 12d and the cooperative display unit 13b so as to be concurrently displayed is transmitted.

Accordingly, if a condition indicating the cooperative display unit 12d illustrated in FIG. 8 is satisfied, it is possible to concurrently start displaying the cooperative display unit 13b which is associated with the cooperative display unit 12d in advance. On the contrary, if a condition indicating the cooperative display unit 13b is satisfied, it is possible to concurrently start displaying the cooperative display unit 12d which is associated with the cooperative display unit 13b in advance.

The highlight display effect can be achieved by the display control as described above. For example, in a case where a driver is looking at the direction deviated from the right side display unit 13B, as long as the driver is looking at the direction in which the cooperative display unit 12d of the central display unit 12B can be seen, the driver can see and confirm the display of the cooperative display unit 12d, thereby also recognizing the display of the cooperative display unit 13b. In addition, even in a case where the driver is looking at the direction deviated from the central display unit 12B, as long as the driver is looking at the direction in which the cooperative display unit 13b of the right side display unit 13B can be seen, the driver can see and confirm the display of the cooperative display unit 13b, thereby also recognizing the display of the cooperative display unit 12d. For this reason, it is possible to obtain the excellent visibility.

Meanwhile, when displaying the cooperative display unit 12d and the cooperative display unit 13b, it may be displayed, for example, in a blinking state. In addition, in a case where each of the cooperative display unit 12d and the cooperative display unit 13b is formed of a plurality of segments, positions of the segments to be displayed may be sequentially switched according to the arrangement of the plurality of segments, and displayed such that the display position is moved from the right to the left or move moved from the left to the right.

<Supplementary Explanation>

Here, features of the embodiments of the composite display device according to the present invention as described above are briefly listed up below (1) to (4).

(1) A composite display device illustrated in FIG. 1 to FIG. 4 is provided with: an optical combiner (15) which reflects and transmits light; a first display unit (20) which displays a virtual image by projecting an image including certain display information to a front surface of the optical combiner; a second display unit (30) which is disposed on a position of a rear surface side of the optical combiner and displays a real image; and a composite display control unit (ECU) that concurrently gives patterns having same or similar shapes as each other to the first display unit and the second display unit as the display information, and gives relative displacement with respect to a direction orthogonal to a gaze axis (A2) of an observer to a first display image (14b) which is formed by the first display unit as the virtual image and a second display image (14a) which is formed by the second display unit as the real image, thereby forming a parallax (Δx, Δy) between the first display image and the second display image.

(2) Moreover, the composite display control unit (ECU) may further form a difference in display pattern size (S1 and S2) between the first display image and the second display image as illustrated in FIG. 7 (S13B, S14B).

(3) Moreover, the composite display control unit (ECU) may further form a difference in display brightness (B1 and B2) between the first display image and the second display image as illustrated in FIG. 7 (S13B and S14B).

(4) Moreover, the composite display device as illustrated in FIG. 8 and FIG. 9 is further provided with a third display unit (12) which is disposed in a different position from the first display unit (14) and the second display unit (13), and when displaying an image of at least one of the first display unit and the second display unit (a cooperative display unit 13b), the composite display control unit (ECU) may display display information (a cooperative display unit 12d) which is relevant to the image on the third display unit (S13C and S14C).

The present invention is described in detail or with reference to the specific embodiments; however, it is apparent for those skilled in the art that various changes and modifications are applicable without departing the spirit and the scope of the present invention.

According to the composite display device of the present invention, it is possible to display specific or certain display information in a state of being particularly highlighted or created. The present invention having such an effect is applicable in a field of a display device for a vehicle capable of being used as display of a dash board in a vehicle.

What is claimed is:

1. A composite display device comprising:
an optical combiner that includes a front surface and a rear surface, and reflects and transmits light that is incident on the front surface;
a first display device configured to project a first display image including certain display information to the front surface of the optical combiner, such that the first display image is displayed by the combiner as a virtual image;
a second display device that is disposed adjacent to the rear surface of the optical combiner and configured to display a second display image as a real image; and
a composite display control device configured to
concurrently instruct the first display device to project the first display image and the second display device to display the second display image such that the virtual image has a shape that is the same as or similar to a shape of the real image, and
instruct one of the first display device and the second display device to display a respective one of the first display image and the second display image in a position such that the virtual image at least partially overlaps the real image, and such that the virtual image is displaced relative to the real image in a direction orthogonal to a gaze axis of an observer, thereby forming a parallax between the virtual image and the real image.

2. The composite display device according to claim 1, wherein the composite display control device is further configured to determine a difference in display pattern size between the first display image and the second display image.

3. The composite display device according to claim 1, wherein the composite display control device is further configured to determine a difference in display brightness between the first display image and the second display image.

4. The composite display device according to claim 1, further comprising:
 a third display device that is disposed in a position different from the first display device and the second display device, wherein
 when displaying an image of at least one of the first display device and the second display device, the composite display control device instructs the third display device to display information on the third display device which is relevant to the image displayed by the at least one of the first display device and the second display device.

5. The composite display device according to claim 1, wherein the optical combiner is located between the first display device and the second display device.

* * * * *